(12) United States Patent
Miike

(10) Patent No.: US 7,759,990 B2
(45) Date of Patent: Jul. 20, 2010

(54) CLOCK SWITCHING CIRCUIT

(75) Inventor: Shougo Miike, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 623 days.

(21) Appl. No.: 11/798,091

(22) Filed: May 10, 2007

(65) Prior Publication Data

US 2007/0273410 A1 Nov. 29, 2007

(30) Foreign Application Priority Data

May 23, 2006 (JP) ............................. 2006-142733

(51) Int. Cl.
*H03L 7/06* (2006.01)
(52) U.S. Cl. ........................... 327/147; 327/99; 327/296
(58) Field of Classification Search .................. 327/99, 327/147, 150, 152, 296
See application file for complete search history.

(56) References Cited

U.S. PATENT DOCUMENTS

| | | | |
|---|---|---|---|
| 6,005,904 A * | 12/1999 | Knapp et al. | ................ 375/376 |
| 6,172,537 B1 * | 1/2001 | Kanou et al. | .................. 327/99 |
| 6,563,349 B2 * | 5/2003 | Menezes et al. | ............... 327/99 |
| 6,653,874 B2 * | 11/2003 | Ishikawa | .................... 327/144 |
| 6,714,056 B2 * | 3/2004 | Fallahi et al. | ............... 327/115 |
| 7,196,554 B2 * | 3/2007 | Taskin et al. | .................. 327/99 |
| 7,212,598 B2 * | 5/2007 | Kliesner et al. | ............. 375/371 |

FOREIGN PATENT DOCUMENTS

| | | |
|---|---|---|
| JP | 7-38398 | 2/1995 |
| JP | 2000-137699 | 5/2000 |
| JP | 2001-202155 | 7/2001 |
| JP | 2004-240818 | 8/2004 |

* cited by examiner

*Primary Examiner*—Lincoln Donovan
*Assistant Examiner*—William Hernandez
(74) *Attorney, Agent, or Firm*—Young & Thompson

(57) ABSTRACT

A clock switching circuit comprises PLL circuits into which external clocks CLKT, CLKB are respectively input, a multiplexer for selecting and outputting either an output PLB of one PLL circuit or an inverted signal of an output PLT of the other PLL circuit, and a clock control circuit for subjecting the multiplexer to switching control on the basis of a Lock determination signal that is asynchronous with CLKB and PLB. When the Lock determination signal is input into the clock control circuit, the clock control circuit switches the output of the multiplexer in synchronization with an offset clock PLQB that is offset from the phase of PLB by a predetermined value.

20 Claims, 16 Drawing Sheets

RELATED ART

CLOCK SWITCHING CIRCUIT

BACKGROUND OF THE INVENTION

1. Field of the Invention

The present invention relates to a clock switching circuit for switching and outputting a plurality of clocks having different phases, and more particularly to a clock switching circuit for switching a clock at a timing that is asynchronous with a switching subject clock.

2. Description of Related Art

QDR (Quad Data Rate) SRAM is SRAM capable of an ultra-high speed operation by separating a data input and a data output, which are constituted by a common terminal in typical SRAM, and performing reading and writing simultaneously while operating the data input and data output respectively at a DDR (Double Data Rate). With QDR SRAM, data transfer can be performed at a higher speed than with a conventional synchronous SRAM product, and therefore QDR SRAM is highly suited to sophisticated next-generation network switches, routers, and so on.

A clock switching circuit into which two True/Bar (hereafter, True: T and Bar: B) clocks having phases differing by 180 degrees are input as external clocks, and which is installed with two PLL circuits corresponding to the respective external clocks, is applied to this type of QDR product. The clock switching circuit is capable of switching between an external clock and a clock (PLL clock hereafter) output by the PLL circuit in accordance with a PLL enable signal.

FIG. 12 is a block diagram showing a peripheral circuit including a clock switching circuit used by a QDR product. A clock switching circuit 101 comprises PLL circuits 102, 103 having external clocks CLKT, CLKB as inputs, a transfer 116 for aligning delays, an inverter 115 for inverting an output PLT of the PLL circuit 102, a multiplexer 114 for selecting and outputting the output of the inverter 115 or the output of the PLL circuit 103, and multiplexers 144, 146 for switching between the externally input T/B clocks (CLKT, CLKB) and PLL output clocks (PTOUT, PBOUT) generated in a chip interior in accordance with a control signal (DLLE) from the outside of the chip. Clocks CKT, CKB output by the clock switching circuit 101 pass through clock trees 105, 109, respectively, and are supplied to resistors 121, 122, or the like for use in an internal clock operation.

For a certain, fixed cycle period following power ON, the PLL circuit requires a waiting time (lockup time) for the output to stabilize. A state from input of a basic clock into the PLL circuit to stabilization of the output clock of the PLL circuit to a predetermined frequency is known as an unlocked state, and a stable state in synchronization with the predetermined frequency is known as a locked state. During the waiting time from the unlocked state to the locked state, the phase of the PLL outputs (PLT, PLB) may not correspond to T/B (180°) even when the T/B phases of the external clocks (CLKT, CLKB) reach 180°, and when this state occurs, problems such as malfunctions and through-currents occur in a subsequent circuit. Hence, the multiplexer 114 is provided so that a T side inverted clock (PLTB) can be used instead of using the PLL output of the B side clock (CLKB). The multiplexer 114 is capable of switching a Fuse or the like, for example, such that one of the outputs is selected and fixed. Note that the internal clock PTOUT is the output PLT of the PLL circuit 102.

In this type of clock switching circuit 101, the control signal (DLLE) is input asynchronously with the clock to be switched, and therefore the multiplexers 144, 146 are switched asynchronously. Further, when control is performed to switch to the output PLB of the PLL circuit 103 after the lockup time of the PLL circuit 103 without fixing the multiplexer 114, the lock detection timing is also asynchronous with PLB, and hence the multiplexer 114 is also switched asynchronously. When clock selection and switching is performed asynchronously with the selected and output clock in the multiplexers 114, 144, 146 in this manner, a short pulse (a glitch) occurs during switching, and this glitch affects the operations of the subsequent circuit. FIG. 13 shows a timing chart of a case in which a glitch occurs. As shown in FIG. 13, clock switching is performed at a timing at which the control signal DLLE is asynchronous with the external clocks CLKT, CLKB and the PLL outputs PLT, PLB, and therefore a glitch occurs in the output clocks CKT, CKB, as shown by A.

In other words, there is a need for a circuit configuration in which a glitch does not occur in a subsequent output clock during switching even when switching from an external clock to an internal clock is performed asynchronously using an external control pin (DLLE) or switching from a T side inverted signal to a B side clock is performed before and after lockup of a PLL circuit.

Incidentally, the following publications are well known as conventional clock switching circuits. First, Japanese Unexamined Patent Application Publication No. 2004-240818 (Kubota) discloses a clock generation circuit that avoiding a long-term stoppage in clock output without adding circuit for oscillating an auxiliary oscillator, and with which a normal operation of a subsequent circuit is achieved even when a short-period lock release occurs in a PPL circuit. FIG. 14 is a block diagram showing the clock generation circuit described in Kubota. FIG. 15A is a timing chart showing the generation of an extremely short pulse in an output clock 201g when a selector circuit 215 is not provided with an input 203. FIG. 15B is a timing chart showing a condition in which an extremely short pulse is not generated in the output clock 201g when the selector circuit 215 is provided with the input 203.

As shown in FIG. 14, a clock generation circuit 210 comprises a PLL circuit 211, a lock detection circuit 212, a counter circuit 213, a selector control circuit 214, and the selector circuit 215. The clock generation circuit 210 further comprises an input terminal 210A into which an input clock 201a is input, and an output terminal 215D for outputting the output clock 201g, which is output by the selector circuit 215. The output terminal 215D of the clock generation circuit 210 is connected to a clock input terminal 216A of a logic circuit 216.

The input clock 201a is input into the input terminal 210A of the clock generation circuit 210, and the input clock 201a is input into a clock input 211A of the PLL circuit 211. The PLL circuit 211 outputs a high speed clock obtained by multiplying the frequency of the input clock 201a as a PLL clock 201b from a multiplied clock output 211B to an input 201 of the selector circuit 215 and a comparative signal input 212B of the lock detection circuit 212.

The lock detection circuit 212 compares the phase of the input clock 201a input into a reference signal input 212A with the phase of the PLL clock 201b input into the comparative signal input 212B to determine whether the PLL circuit 211 is in an unlocked state or a locked state, and outputs an unlock signal 201c indicating the determination result from an unlock output 212C. The unlock signal 201c is active when the PLL circuit 211 is in an unlocked state and the lock is released. The unlock signal 201c output by the lock detection circuit 212 is input into an enable input 213A of the counter circuit 213 and a condition input 221 of the selector control circuit 214.

In the counter circuit 213, the period during which the PLL circuit 211 is in an unlocked state (a lock released state) is counted by counting an active period during which the unlock signal 201c indicates the aforementioned unlocked state. The unlock signal 201c is also input into the enable input 213A of the counter circuit 213, and during the active period of the unlock signal 201c, a counting operation is executed by the input clock 201a connected to a clock input 213B. When the unlock signal 201c becomes non-active, the count value is returned to its initial value.

Further, the selector circuit 215 leads one of the PLL clock 201b input into the input 201, the input clock 201a input into an input 202, and a fixed value "0" serving as a logical value input into an input 203 selectively to an output 215D on the basis of a value of a select signal 201f input into a select input 215E.

A select output 214B of the selector control circuit 214 is connected to the select input 2415E of the selector circuit 215, and the select signal 201f is input into the select input 215E from the select output 214B. As will be described below, when switching between the input 201 and the input 202 in the selector circuit 215, or in other words when switching between the PLL clock 201b and the input clock 201a having different periods, a malfunction in a subsequent logic circuit is prevented by first passing through the input 203 (fixed value 0).

In the clock generation circuit 210, if the selector circuit 215 switches the connection to the output 215D from the input 201 to the input 202 directly such that a phase deviation occurs between the PLL clock 201b (input 201) and the input clock 201a (input 202), as shown in FIG. 15A, an extremely short pulse is output to the output 215D as the output clock 201g, and this may cause a malfunction in the subsequent logic circuit 216.

On the other hand, by providing the input 203 in the selector circuit 215 such that switching between the input 201 and the input 202 is performed via the input 203, the output period of the fixed value 0 is interposed between the output period of the PLL clock and the output period of the input clock, as shown in FIG. 15B, and therefore generation of an extremely short pulse such as that of FIG. 15A can be prevented, thereby preventing a malfunction.

In other words, in the clock generation circuit 210, the selector circuit 215 is controlled by the select signal 201f from the selector control circuit 214. When the period during which the PLL circuit 211 is in the unlocked state exceeds a predetermined value, the input clock 201a is output instead of the PLL clock 201b. Hence, there is no need to add a circuit for oscillating an auxiliary oscillator, and as a result, frequent clock switching such as that of the related art can be avoided, and operations of a subsequent circuit can be stabilized.

Japanese Unexamined Patent Application Publication No. 2000-137699 (Ueno) discloses a microcomputer in which current consumption in an IDLE mode can be reduced and a time required to restore program execution by a CPU can be shortened when the IDLE mode is released. FIG. 16 is a block diagram showing the microcomputer described in Ueno. The microcomputer comprises an oscillation circuit 301, a PLL circuit 302, a frequency half divider 304, a first AND circuit 303, a second AND circuit 305, a selector 306, and an RS flip-flop 307.

In the oscillation circuit 301, terminals X1, X2 are connected respectively to terminals of an external crystal oscillator, for example, and grounded via a capacitor. The oscillation circuit 301 may be constituted by a crystal oscillation circuit comprising an inverting circuit and a feedback resistor connected in series between the terminals X1, X2, and a circuit for subjecting the output of the inverting circuit to waveform shaping and then outputting the waveform-shaped output. In a STOP mode, a STOP control signal serving as logical 1 is input. The STOP control signal serves as a control signal of a switch connected between one end of the feedback resistor and the terminal X1 or between the other end of the feedback resistor and the terminal X2, for example, and when the STOP control signal is logical 1, an oscillation operation is stopped by switching the switch OFF.

The PLL circuit 302 comprises a phase difference detection circuit into which a reference signal and a signal obtained by frequency-dividing the oscillation output of a voltage controlled oscillation circuit (VCO) using a frequency divider are input, a charge pump circuit, a loop filter, and the voltage controlled oscillation circuit. When the STOP control signal is logical 1, an oscillation operation is stopped by severing the path of a ring oscillator of the voltage controlled oscillation circuit, for example.

The frequency half divider 304 shapes the duty ratio of the output clock from the PLL circuit 302. The first AND circuit 303 inputs an inverted value of an IDLE control signal serving as logical 1 during an IDLE mode, and the output of the PLL circuit 302, and in the IDLE mode, when the IDLE control signal is logical 1, masks clock supply to an internal circuit without transmitting the output of the PLL circuit 302 to the frequency half divider 304. The second AND circuit 305 inputs an inverted value of a control signal taking a value of logical 1 while waiting for oscillation stability after the STOP mode has been released, and the output of the frequency half divider 304. From the STOP mode to the oscillation stabilization period following release of the STOP mode, the second AND circuit 305 masks the output of the frequency half divider 304 so that it is not transmitted to the internal circuit as an internal clock.

Further, an UNLOCK flag output from the PLL circuit 302 is a status flag indicating whether the PLL circuit 302 is in an unlocked state or a locked state, which is typically allocated to a status resistor or the like indicating the state of the PLL circuit 302. The locked state/unlocked state is detected in the PLL circuit 302 on the basis of the output of a phase difference detection circuit, and set in a status resistor within the PLL circuit 302.

A negative logic signal of the IDLE control signal serving as logical 1 in the IDLE mode is input into an S (set) input terminal of the RS flip-flop 307. A negative logic signal of the UNLOCK flag output from the PLL circuit 302 is input into an R (reset) input terminal. An output Q is used as a switching signal of the selector 306. The selector 306 is supplied with a clock (pre-multiplication clock) of the oscillation circuit 301 and a clock that is frequency-divided by the frequency half divider 304 after the output of the oscillation circuit 301 is multiplied by four in the PLL circuit 302, and selects and outputs one of these clocks. In other words, when the aforementioned switching signal is logical 0, the output of the second AND circuit 305 is selected and output, and when the switching signal is logical 1, the output of the oscillation circuit 301 is selected and output.

In a clock switching multiplexer for a low power consumption processing device described in Japanese Unexamined Patent Application Publication No. 2001-202155 (Kameya et al.), control is performed during switching of high speed and low speed clocks to apply an appropriate delay to the switching timing of a switching signal such that switching is performed when the high speed and low speed clock levels are both stable at a high level.

Further, in a clock switching circuit described in Japanese Unexamined Patent Application Publication No. 7-38398

(Arai), the generation of a glitch is prevented by shifting the switching timing of a first clock and a second clock obtained by frequency-dividing a master clock to a predetermined logical value of the corresponding clock.

However, in the technique described in Kubota, clock switching is performed by fixing the output clock to "0" during switching (201f select signal [1:0.] is in a state of 01), and therefore frequency variation during switching increases (see FIG. 17). Furthermore, in Kubota, when switching the two clocks having 180° differing phases in relation to T/B from the T side inverted signal to the B side clock while the PLL circuits are both in a locked state, a glitch is generated in the B side clock, possibly leading to instability in the operation of a subsequent circuit.

Further, in the technique described in Ueno, the switching timing is constituted by the RS flip-flop 307, and therefore clock switching is performed immediately upon reception of variation in the unlock flag. As a result, a short convex pulse may be generated during switching. Furthermore, when the T/B switching described above is implemented, the respective T/B clock signals do not have 180° differing phases during the period lasting until locking by the PLL circuit 302. In other words, the phase difference does not reach 180°, and therefore the subsequent circuit becomes unstable, leading to problems such as the output data becoming unknown data and a through-current flowing temporarily in the output resistor, for example.

Further, in the technique described in Kameya et al., the two clocks that are switched (the high speed clock and the low speed clock) are frequency-multiplied clocks, and the Rise edge/Fall edge of the switching subject clocks are aligned. In other words, when the Rise edge/Fall edge of the switching subject clocks are not aligned, as in the clock switching circuit shown in FIG. 12, a glitch is generated in the manner described above.

Furthermore, in the technique described in Arai, although a glitch is not generated during switching, frequency variation occurs during clock switching. In other words, the clock switching circuit described in Arai has flip-flops (FF) operated respectively by the falling and rising of the master clock, and the clocks are switched by controlling a selection circuit in accordance with the output of these FFs. However, a period during which neither of the clocks is selected occurs, leading to the generation of a low level fixed interval corresponding to the half period of the master clock, which appears in the output CLK.

SUMMARY

According to an aspect of the present invention, there is provided a clock switching circuit for switching and outputting a plurality of clocks having different phases, which includes a first phase adjustment circuit for outputting a first phase adjusted clock following input of a first external clock, a selection unit for selecting and outputting the first phase adjusted clock or another clock having a different phase to the first phase adjusted clock, and a switching control unit for subjecting the selection unit to switching control on the basis of the first phase adjusted clock and an asynchronous switching instruction signal that is asynchronous with the other clock. The switching control unit switches an output of the selection unit in synchronization with an offset clock that is offset from the phase of the first phase adjusted clock by a predetermined value, when the asynchronous switching instruction signal is input therein.

In the present invention, an output of a selection unit is switched in synchronization with an offset clock that is offset from the phase of a first phase adjustment clock by a predetermined value, and in so doing, the pulse width during switching can be set so as to correspond to the offset phase.

According to another aspect of the present invention, there is provided a clock switching circuit includes a first external/internal clock selection unit for selecting and outputting a first external clock or a first internal clock, a PLL circuit for outputting a PLL clock following input of a second external clock having a different phase to the first external clock, a second external/internal clock selection unit for selecting and outputting the second external clock or the PLL clock, which serves as a second internal clock having a different phase to the first internal clock, and first and second switching control units for respectively subjecting the first and second external/internal clock selection units to switching control on the basis of an asynchronous switching instruction signal supplied from outside asynchronously with the first and second external clocks. The first and second switching control units switch the outputs of the first and second external/internal clock selection units in synchronization with first and second offset clocks that are offset from the respective phases of the first and second PLL clocks by predetermined values, when the asynchronous switching instruction signal is input therein.

In the present invention, when an external clock and an internal clock are switched on the basis of an asynchronous switching instruction signal that is asynchronous with the external clock and internal clock, the external clock and internal clock, are switched in synchronization with a clock that is offset from the phase of first and second PLL clocks by a predetermined value, and in so doing, the pulse width during switching can be set so as to correspond to the offset phase. In other words, according to the present invention, a clock switching circuit in which a glitch is not generated in an output clock during switching even when clocks having differing phases are switched on the basis of an asynchronous switching signal can be provided.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In these embodiments, the present invention is applied to a clock switching circuit supplied with two T/B external clocks having 180 degree differing phases and installed with PLL circuits corresponding respectively to the two external clocks. This type of clock switching circuit may be used favorably to read the data of high speed SRAM such as QDR SRAM and so on.

First Embodiment

Figure 1:
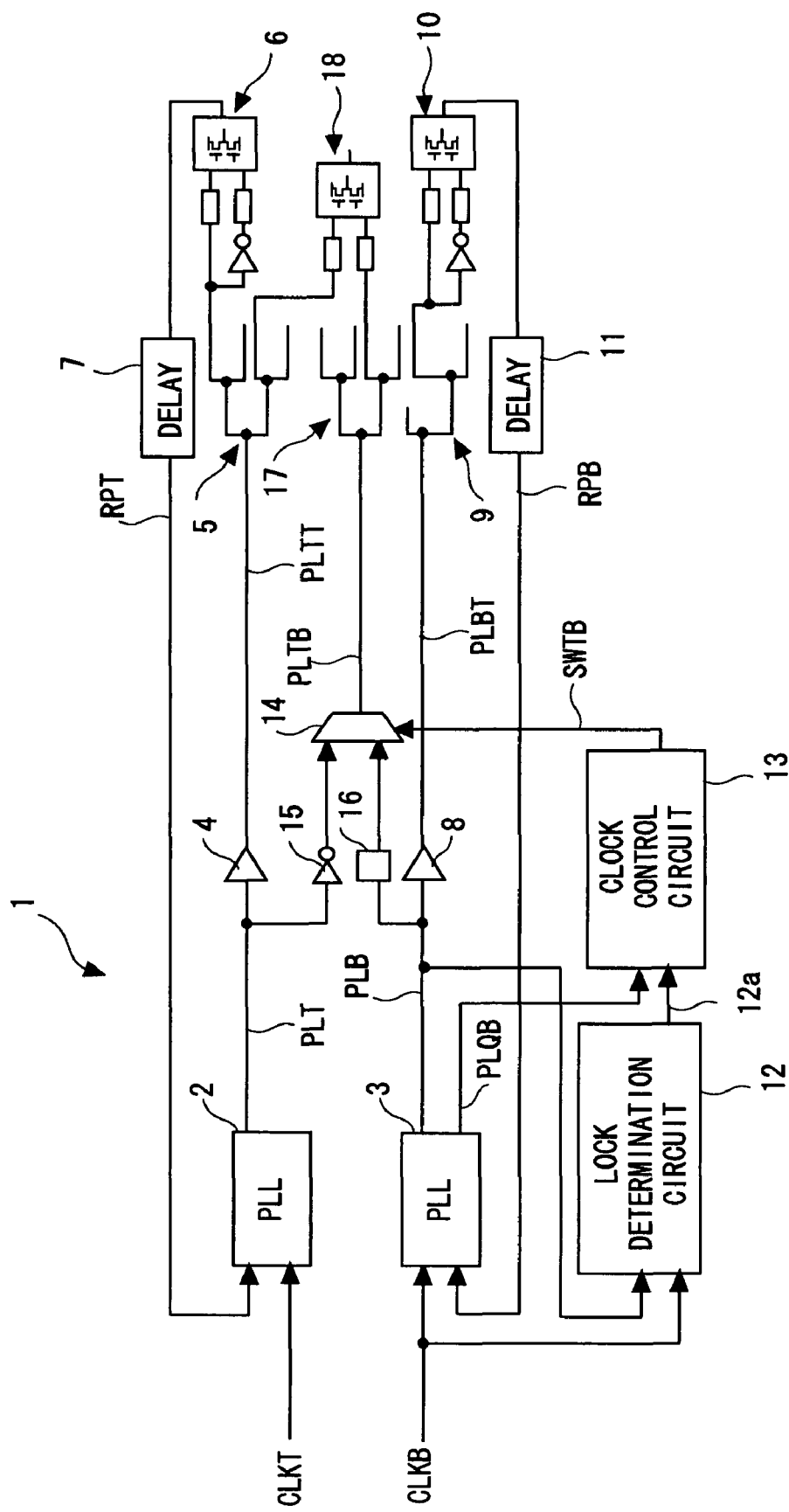
FIG. 1 is a block diagram showing a clock switching circuit according to a first embodiment of the present invention.
Figure 12:
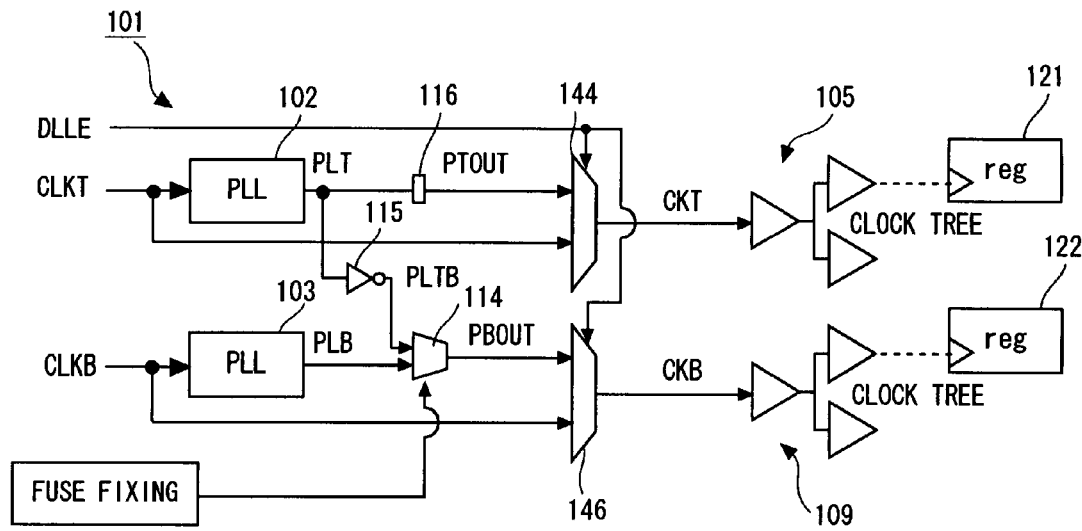
FIG. 12 is a block diagram showing the periphery of a conventional clock switching circuit used in a QDR product.
Figure 13:
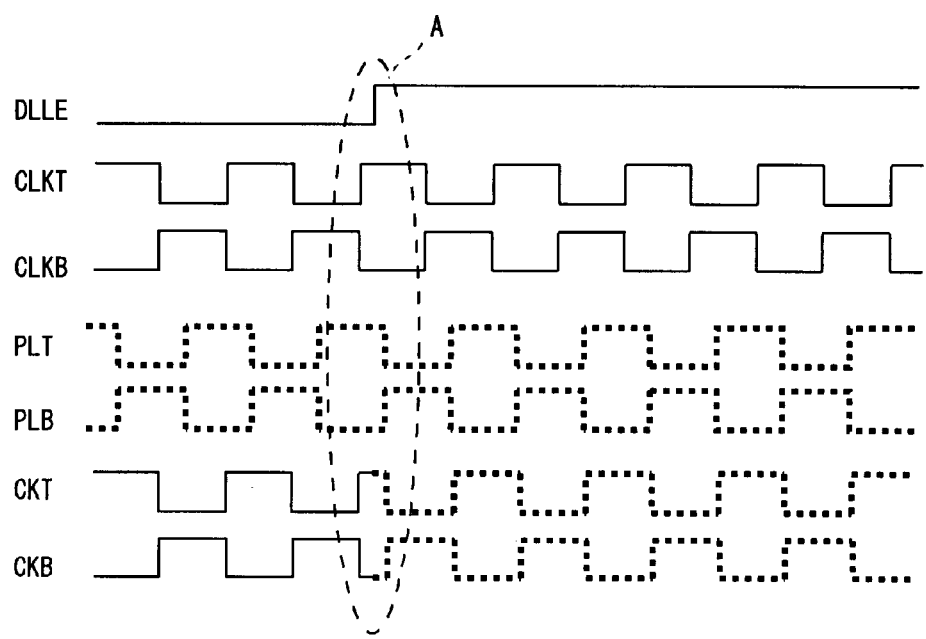
FIG. 13 is a timing chart showing a case in which a glitch is generated in the conventional clock switching circuit.
Figure 14:
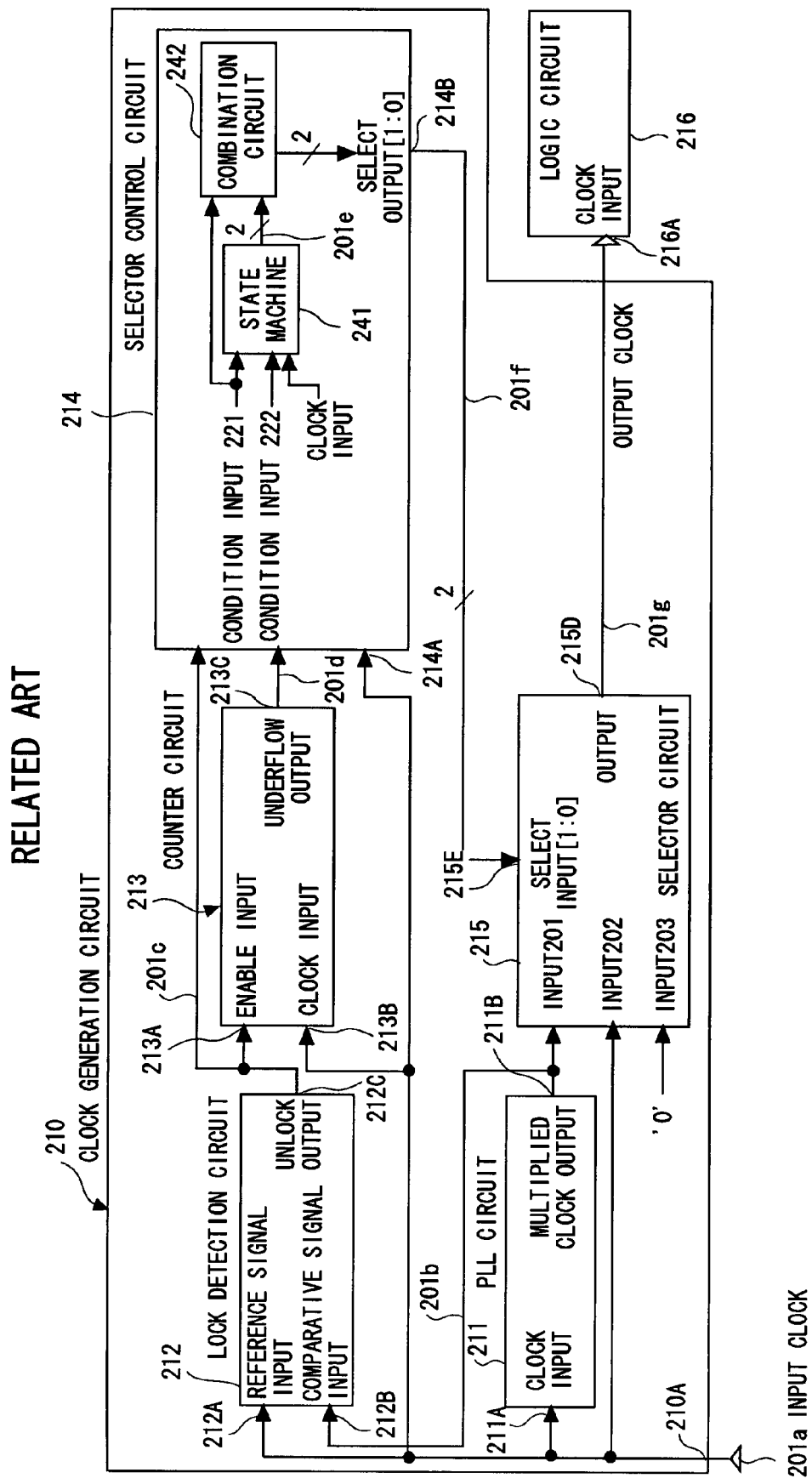
FIG. 14 is a block diagram showing a clock generation circuit described in Kubota.
Figure 15A:
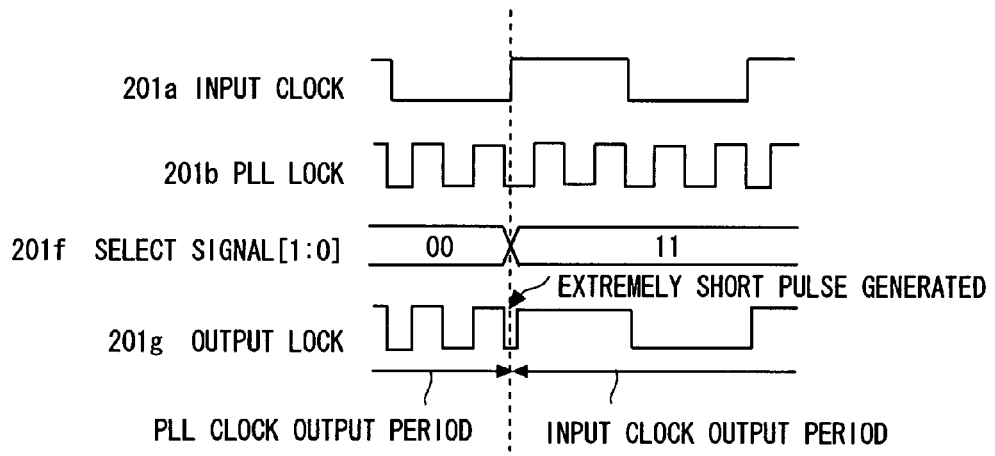
FIG. 15A is a timing chart showing the generation of an extremely short pulse in an output clock 201g when a selector circuit 215 is not provided with an input 203.
Figure 15B:
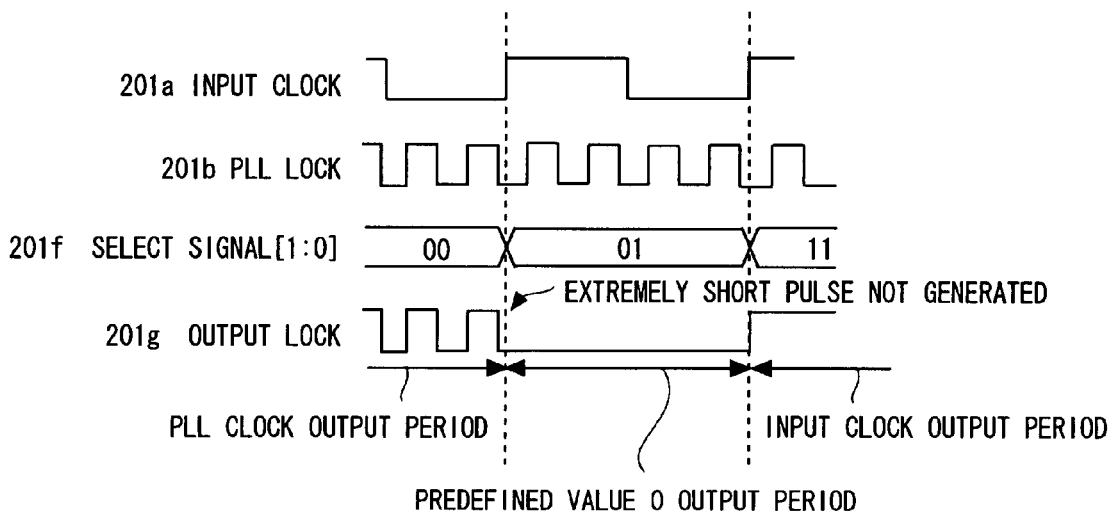
FIG. 15B is a timing chart showing a condition in which an extremely short pulse is not generated in the output clock 201g when the selector circuit 215 is provided with the input 203.
Figure 16:
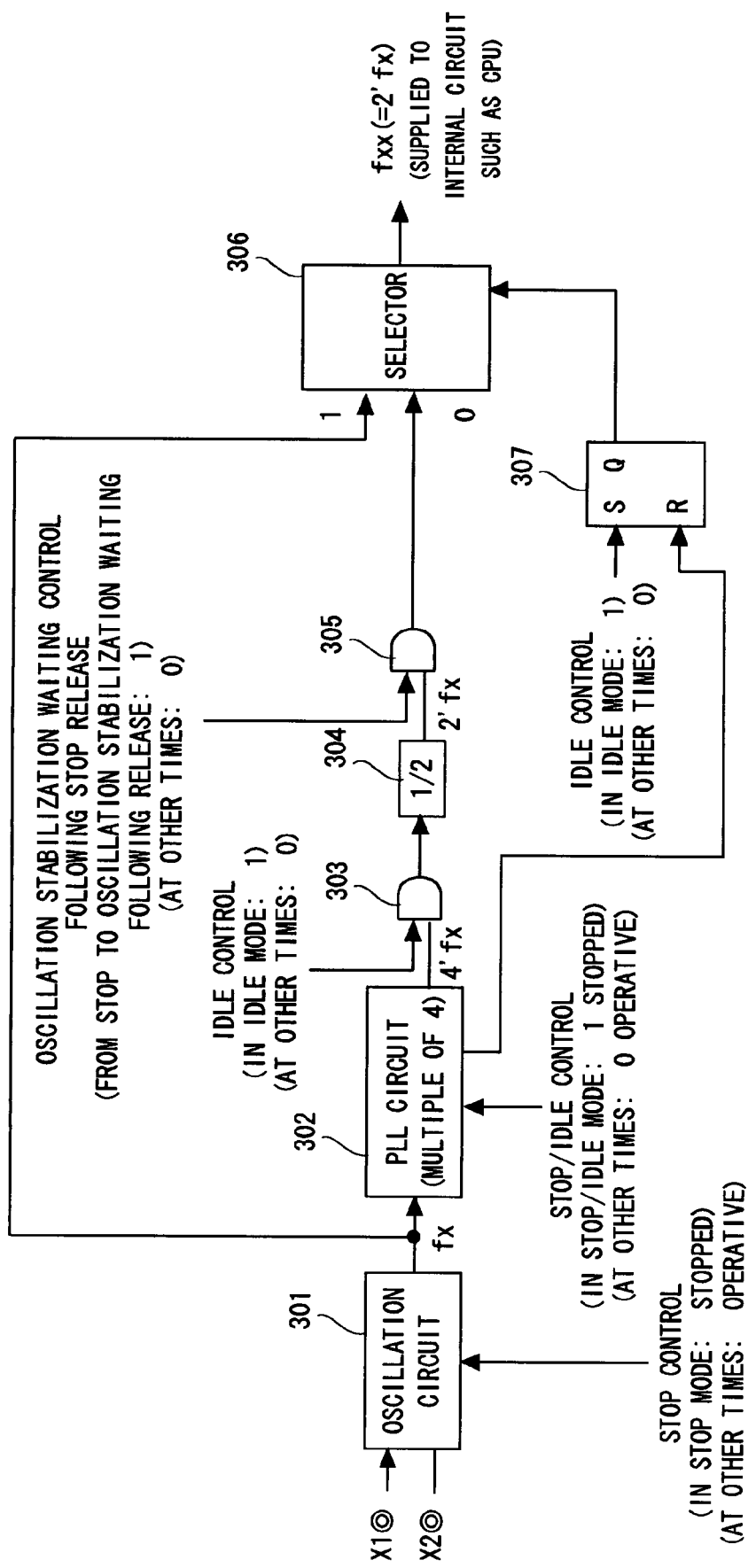
FIG. 16 is a block diagram showing a microcomputer described in Ueno.
Figure 17:
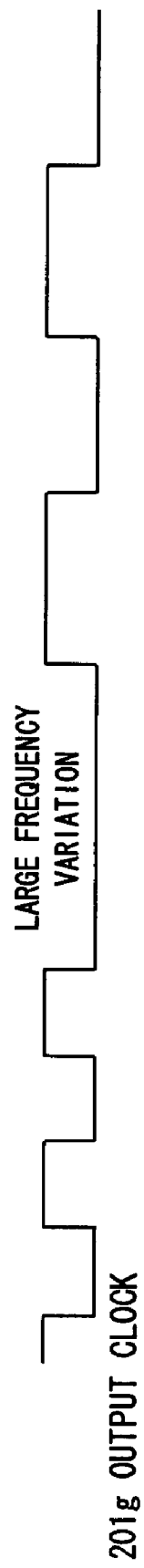
FIG. 17 is a view illustrating a clock following switching, described in Kubota.

In this embodiment, the conventional clock switching circuit shown in FIG. 12 and described above is provided with a control unit for controlling clock switching such that a glitch does not occur. FIG. 1 is a block diagram showing a clock switching circuit 1 according to an embodiment of the present invention. Input signals CLKT and CLKB are external input clock signals having 180° differing phases. PLL circuits 2, 3 are provided for each of the CLKT and CLKB inputs. Hereafter, the PLL circuit into which CLKT is input will be referred to as a T side PLL circuit 2, and the PLL circuit into which CLKB is input will be referred to as a B side PLL circuit 3. The B side PLL circuit 3 is provided as a first phase adjustment circuit or a first PLL circuit, and the T side PLL circuit 2 is provided as a second phase adjustment circuit or a second PLL circuit.

The clock switching circuit 1 outputs internal clocks PLTT, PLTB, PLBT. The internal clock PLTT, which serves as a first internal clock, is output from an output PLT (second PLL clock) of the T side PLL circuit 2, passes through a buffer 4, a clock tree 5, and an output buffer 18, and is used as an internal operation clock for reading SRAM or the like, for example. The clock switching circuit 1 also comprises a clock tree 5 and an output buffer 6 having a similar delay to that of the clock tree 17 and output buffer 18, and a delay circuit (delay) 7 for a replica delay.

The internal clock PLTB results from selecting and outputting one of an inverted signal of the output PLT of the T side PLL circuit 2 and the output PLB (second PLL clock) of the B side PLL circuit 3. For this purpose, the clock switching circuit 1 comprises an inverter 15 for inverting PLT, a transfer gate (switch) 16, and a multiplexer 14. Here, the transfer gate 16 is inserted for the purpose of delay alignment with the inverter 15. Either the output of the inverter 15, or in other words the inverted signal of PLT, or PLB after passing through the transfer gate 16 is input into the multiplexer 14 and then selected and output in accordance with a switching selection signal SWTB to be described below. This output is the internal clock PLTB serving as a first internal clock. The internal clock PLTB is a signal having a phase that differs from the phase of the aforementioned internal clock PLTT by 180 degrees. The internal clock PLTB also passes through the clock tree 17 and output buffer 18 and is used as an internal operation clock for reading SRAM or the like.

Likewise on the B side, the clock switching circuit 1 comprises a clock tree 9 and an output buffer 10 having a similar delay to that of the clock tree 17 and output buffer 18, and a delay circuit (delay) 11 for a replica delay.

The delay circuit 7 has an identical delay (a replica delay) to the delay from the clock tree 5 to the output buffer 18, and a feedback signal RPT passing through the delay circuit 7 is returned to the T side PLL circuit 2. Further, the delay circuit 11 has a delay (a replica delay) that is adjusted such that the timing of a Rise edge of the external clock CLKT and the timing of output transition points of the output buffers 18, 6, 10 match, and a feedback signal RPB passing through the delay circuit 11 is returned to the B side PLL circuit 3. By means of these feedback paths, the internal clocks PLTT and PLTB output from the output buffer 18 have a predetermined phase difference to the external clocks CLKT, CLKB.

The clock switching circuit 1 further comprises a Lock determination circuit (lock state detection circuit) 12 for detecting the lock state of the B side PLL circuit 3, having the external clock CLKB and the output PLB of the B side PLL circuit 3 as input. The Lock determination circuit 12 is used to determine whether or not the B side PLL circuit 3 is in a locked state. The clock switching circuit 1 further comprises a clock control circuit 13 being inputted the output of the Lock determination circuit 12 and a clock (to be referred to hereafter as an offset clock) PLQB to be described below, which has a phase offset relative to the output clock PLB of the B side PLL circuit 3. The clock control circuit 13 generates the aforementioned switching selection signal SWTB and controls switching of the multiplexer 14.

Figure 2:
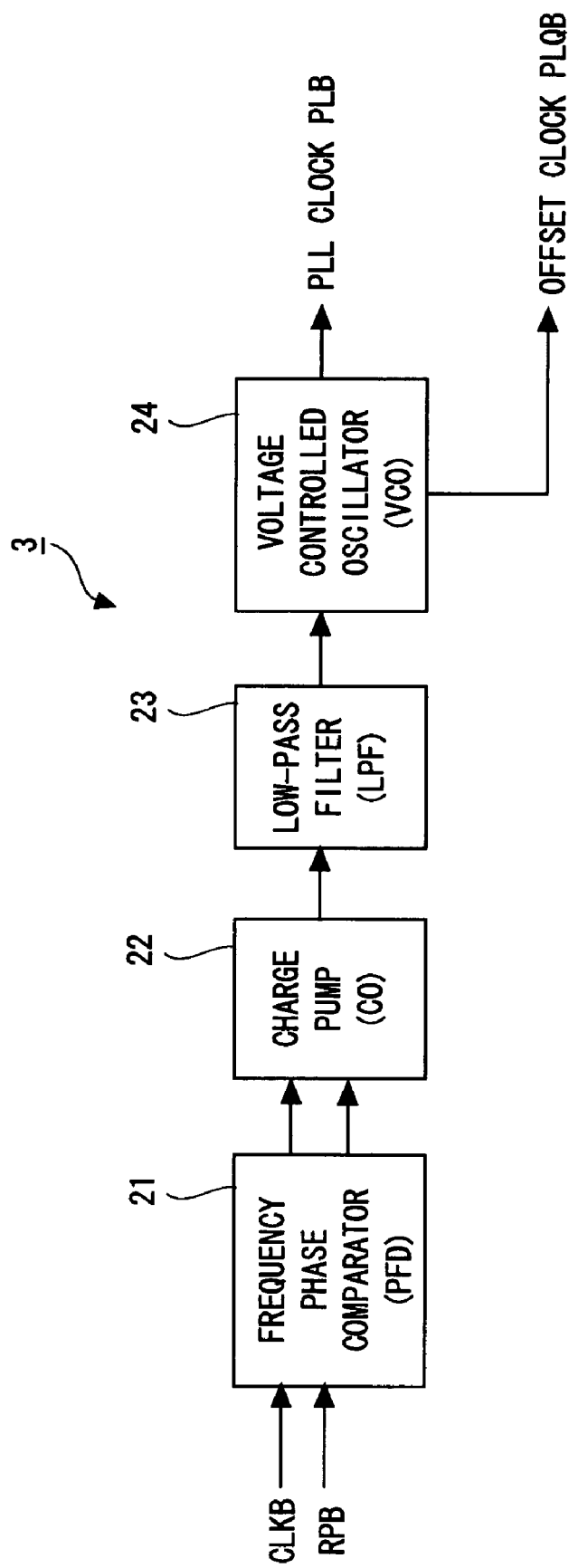
FIG. 2 is a block diagram showing an example of a T side PLL circuit.

FIG. 2 is a block diagram showing an example of the circuit configuration of the T side PLL-circuit 2 and B side PLL circuit 3. The T side PLL circuit 2 and B side PLL circuit 3 differ only according to whether or not the offset clock PLQB is output from the voltage controlled oscillator 24. Here, the B side PLL circuit 3 will be described.

As shown in FIG. 2, the B side PLL circuit 3 has a frequency phase comparator (PFD) 21 into which CLKB and the feedback clock RPB are input. The B side PLL circuit 3 also comprises a charge pump circuit (CP) 22, a low-pass filter (LPF) 23, and a voltage controlled oscillator (VCO) 24. In the B side PLL circuit 3, the phase comparator 21 inputs two signals, namely an UP signal and a DN (down) signal, into the charge pump circuit 22. The phase comparator 21 compares the phase difference in the rising edges of the two input clocks (the internal clock CLKB and the feedback clock RPB), and activates UP or DN in a direction for making the phases match. Upon reception of the UP or DN signal, the charge pump circuit 22 generates a fixed current, and charges a charge in both the + and − directions (the charge is charged in the + direction with respect to UP and in the − direction with respect to DN). By repeating this operation, a capacitive element of the low-pass filter 23 takes a voltage corresponding to the output frequency, and this voltage is input into the voltage controlled oscillator 24. The voltage controlled oscillator 24 oscillates at a frequency corresponding to the input voltage. The signal is frequency-divided as required and then returned and input into the phase comparator 21 to farm a closed loop. The closed loop stabilizes when the two clock frequencies input into the phase comparator 21 become equal.

Figures 3A, 3B:
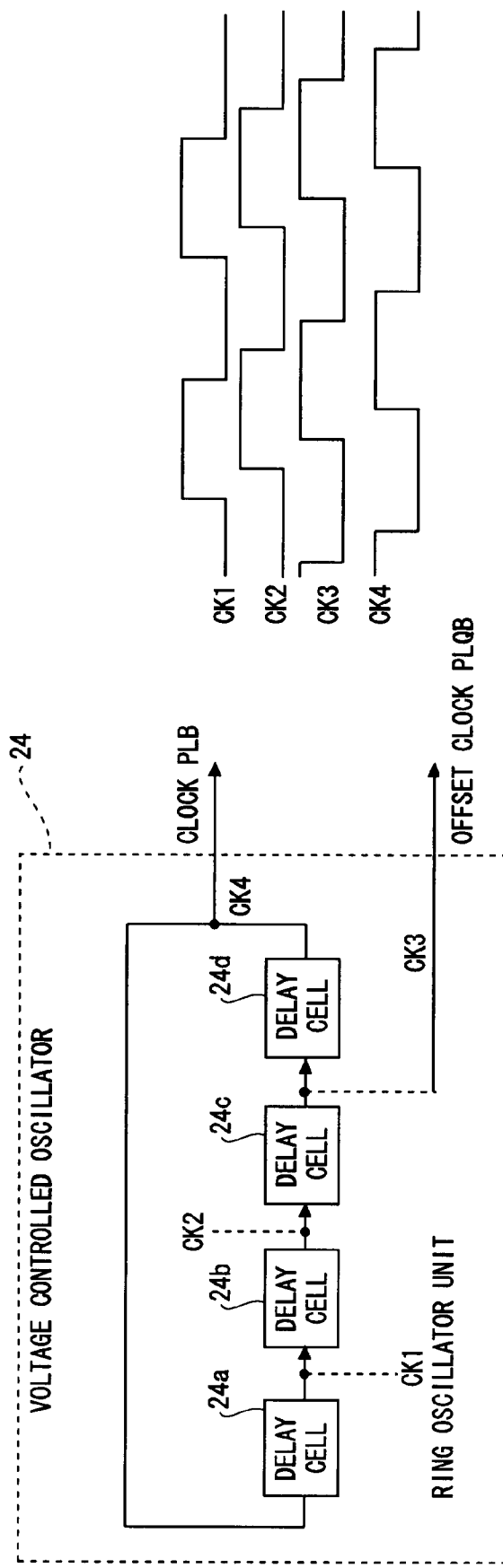
FIG. 3A is a view showing a voltage controlled oscillator of a B side PLL circuit.
FIG. 3B is a view showing the output of various delay cells of a ring oscillator unit as clocks CK1 to CK4.

FIG. 3A is a view showing the voltage controlled oscillator 24 of the B side PLL circuit 3. The voltage controlled oscillator 24 serves as a ring oscillator unit constituted by four delay cells (24a to 24d) including an inverter. Here, the offset clock PLQB is offset by a constant phase relative to the PLL clock PLB generated in the B side PLL circuit 3 on the basis of the external clock CLKB. When the outputs of the respective delay cells 24a to 24d of the ring oscillator unit are set as clocks CK1 to CK4, each clock CK1 to CK4 has a phase difference of 45°, as shown in FIG. 3B. In this example, the clock CK3, which has a phase difference of 90° to the clock PLB, is used as the offset clock PLQB, for example. Note that in this embodiment, an example in which CK3 is used as the offset clock PLQB will be described, but any clock offset by a constant phase relative to the PLL clock PLB may be used. Accordingly, the offset clock PLQB may be generated by the delay output of the PLL clock PLB, for example.

Returning to FIG. 1, when a Lock determination signal (detection signal) 12a indicating that a locked state has been determined by the Lock determination circuit 12 is input into the clock control circuit 13, the clock control circuit 13 generates the switching signal SWTB in synchronization with the offset clock PLQB and outputs the switching signal SWTB to the multiplexer 14. The Lock determination signal 12a of the Lock determination circuit 12 is asynchronous with the PLL clocks PLT, PLB, and functions as an asynchronous switching instruction signal for switching the multiplexer 14 on the basis of the signal. As will be described below, a PLL enable signal DLLE input from the outside or the like may also function as the asynchronous switching instruction signal as well as the Lock determination signal 12a.

Before the B side PLL circuit 3 is locked, the multiplexer 14 outputs an inverted signal of the PLL clock PLT of the T side PLL circuit 2 as the internal clock PLTB. Once the B side PLL circuit 3 is locked, the multiplexer 14 outputs the PLL clock PLB of the B side PLL circuit 3. In this example, the transfer gate 16 is constituted to have an identical delay to the inverter 15, while the buffers 4, 8 are constituted to have identical delays to the delay from the inverter 15 or transfer gate 16 to the multiplexer 14. Hence, the delays from PLL clock PLT to the internal clock PLTT of the T side PLL circuit 2, from the PLL clock PLB to the internal clock PLTB of the B side PLL circuit 3, and from PLB to the internal clock PLBT are all identical.

In the clock switching circuit 1, it is impossible to ensure that the two T/B output clocks have a phase difference of 180 degrees during the cycle period lasting until the PLL circuit 3 is locked. Hence, to ensure a 180 degree phase on the B side during the period until locking, a signal obtained by inverting the output clock of the T side PLL circuit 2 is substituted for the B side clock. Then, when the B side PLL circuit 3 is locked, the inverted signal of the T side PLL circuit 2 is switched to the output clock of the B side PLL circuit 3. During this clock switching, the offset clock PLQB, which is offset from the output clock PLB of the PLL circuit 3 by a certain fixed value, for example 90 degrees, 270 degrees, and so on, is used, and the switching operation is controlled in synchronization with the offset clock PLQB. In so doing, frequency variation does not occur during switching, no glitches are generated, and a large switching timing width (valid window) can be secured.

Figure 4:
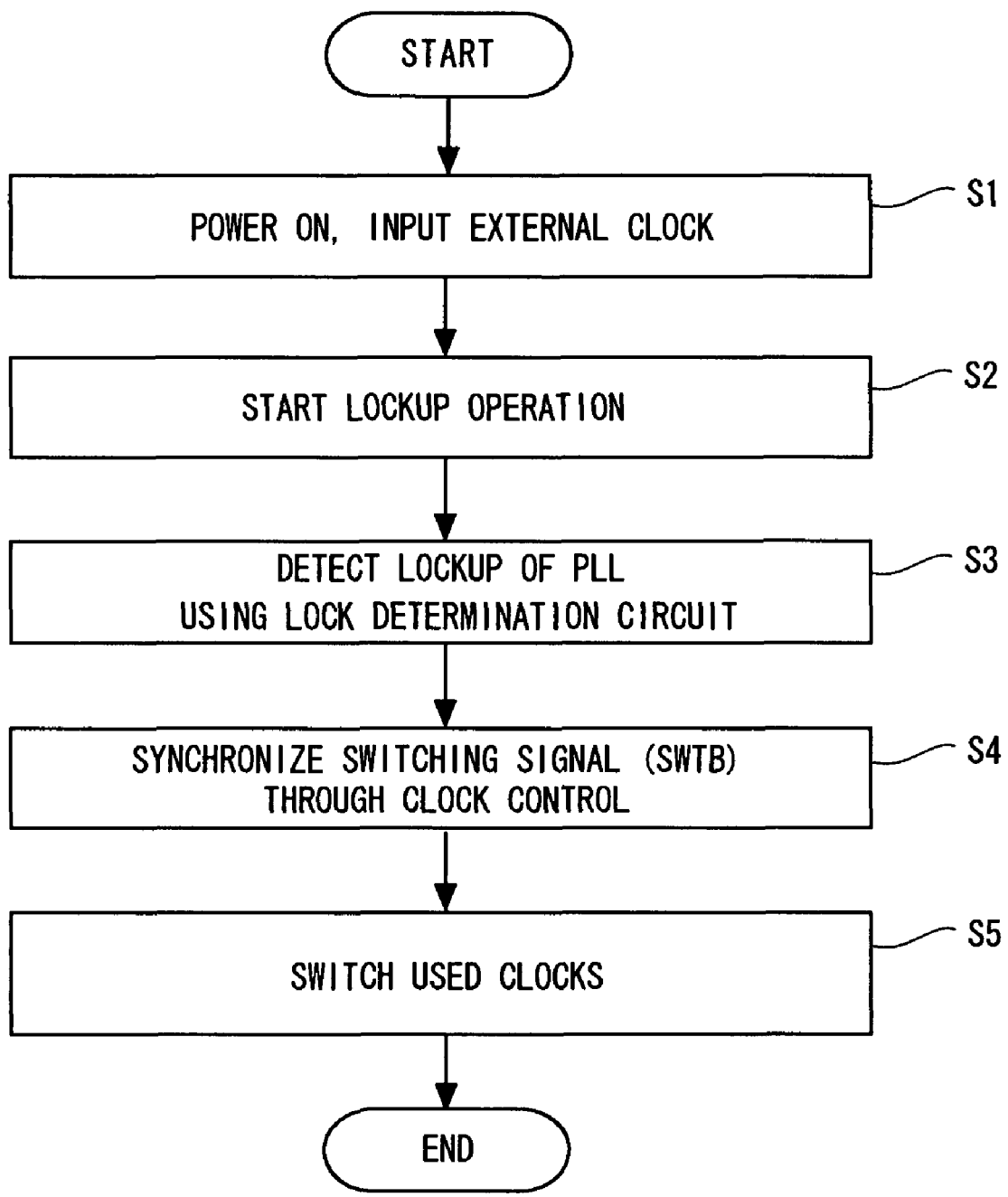
FIG. 4 is a flowchart showing an operation of the clock switching circuit according to the first embodiment of the present invention.
Figure 5:
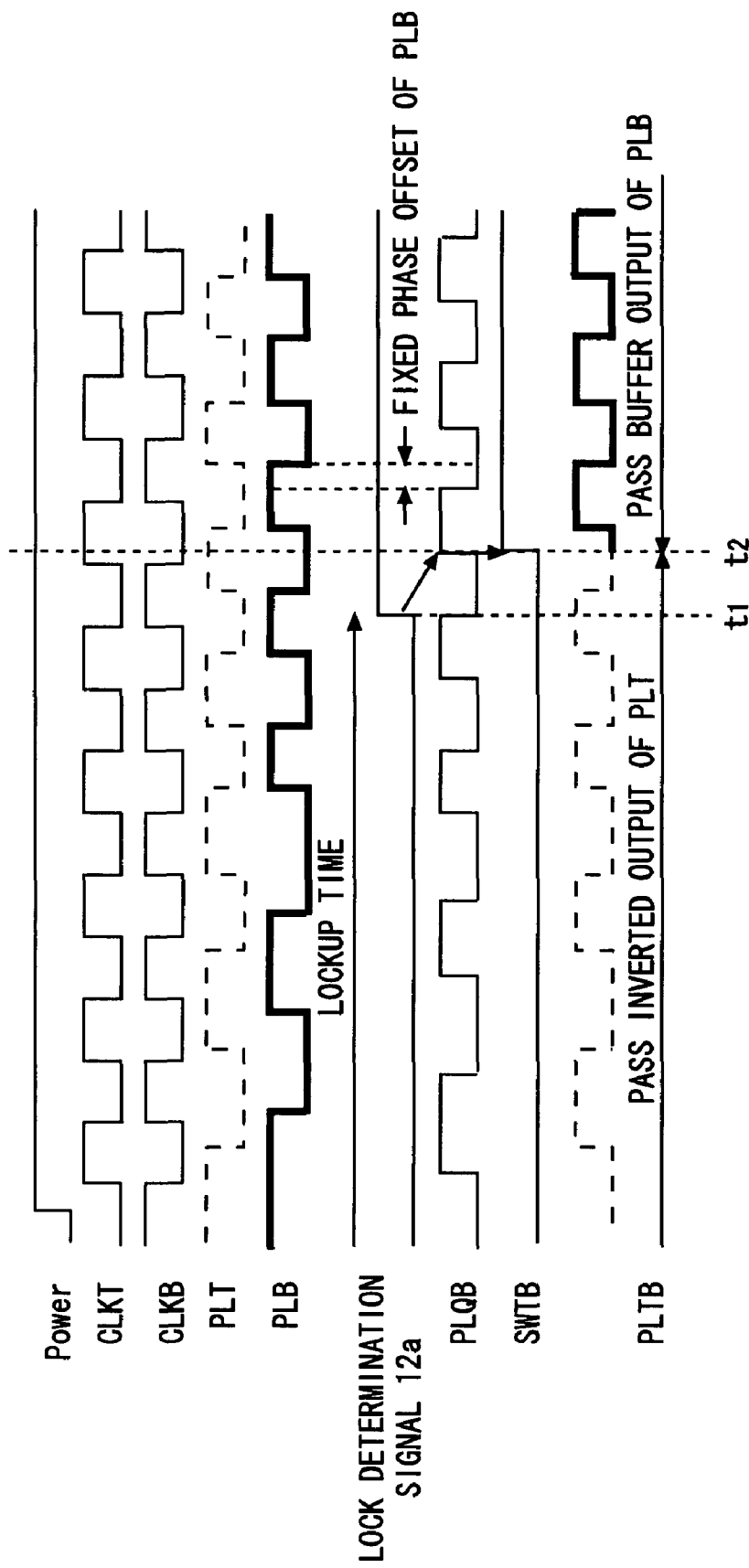
FIG. 5 is a view showing a timing chart of the clock switching circuit according to the first embodiment of the present invention.

Next, an operation of the clock switching circuit according to this embodiment will be described. FIG. 4 is a flowchart showing an operation extending from the power ON, through locking of the PLL circuit, to switching to the internal clock. FIG. 5 is a view showing a corresponding timing chart.

First, the power is switched ON and the external clocks CLKT, CLKB are supplied (step S1). An inverted signal of the PLL clock PLT of the T side PLL circuit 2 is output as the internal clock PLTB following power ON until the B side PLL circuit 3 is locked (step S2). The Lock determination circuit 12 detects the point at which the PLL circuit 3 enters a locked state (step S3). The Lock determination signal 12a shifts to High at a timing t1 at which the Lock determination circuit 12 detects the locked state, and the Lock determination signal 12a is supplied thus to the clock control circuit 13. The clock control circuit 13 generates the switching selection signal SWTB in synchronization with the offset clock PLQB on the basis of the Lock determination signal 12a (step S4). The switching signal SWTB synchronized with the offset clock PLQB is then input into the multiplexer 14. By means of the switching signal SWTB, the output PLTB of the multiplexer 14 is switched from the inverted signal of the T side PLL circuit 2 to the output PLB of the B side PLL circuit 3 at a timing t2 (step S5).

In this embodiment, when switching from the inverted signal of the T side PLL circuit 2 to the output PLB of the B side PLL circuit 3, first the phases of the inverted signal and PLB are aligned. Then, the switching selection signal SWTB used in the switching circuit (multiplexer) for switching the two is synchronized with the offset clock, which is offset from the PLL clock PLB by a constant phase (90°, for example) from the ring oscillator provided in the interior of the B side PLL circuit 3. By using this switching signal, the multiplexer 14 can be subjected to switching control independently of the frequency of the external clocks CLKT, CLKB and at a timing maintaining a fixed phase deviation relative to the PLL clock PLB at all times, and as a result, glitches and the like can be prevented from occurring during switching.

Second Embodiment

Next, a second embodiment will be described. In this embodiment, the external clocks CLKT, CLKB and internal clocks PLTT, PLTB are switched using the PLL enable signal DLLE. The PLL enable signal DLLE is input from the outside asynchronously with the external clocks CLKT, CLKB and internal clocks PLTT, PLTB, and serves as an asynchronous switching instruction signal instructing clock switching.

Figure 6:
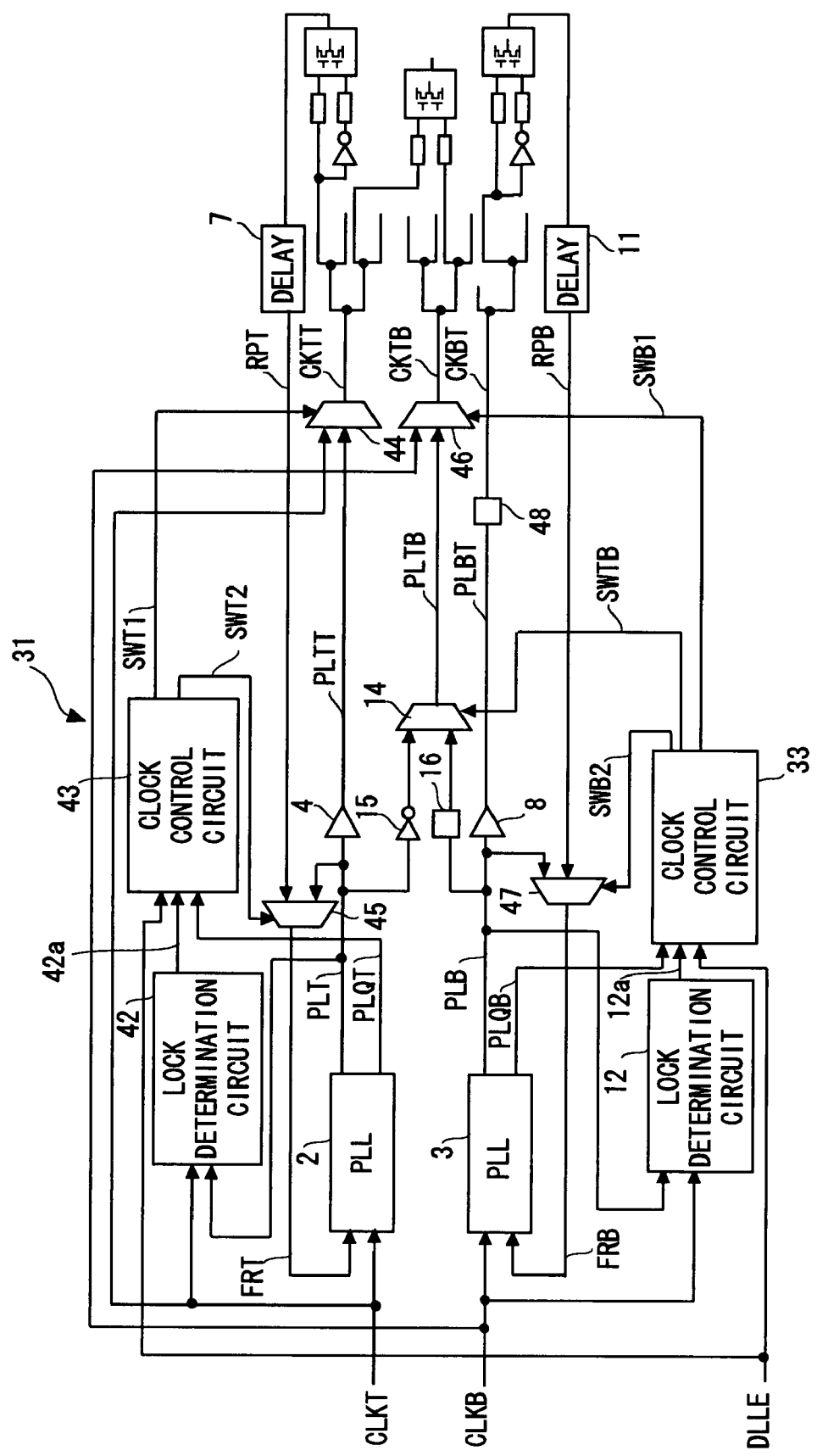
FIG. 6 is a block diagram showing a clock switching circuit according to a second embodiment of the present invention.

FIG. 6 is a block diagram showing a clock switching circuit 31 according to this embodiment. Note that in the clock switching circuit 31 according to this embodiment, shown in FIG. 6, and also in a third embodiment shown in FIG. 11, to be described below, identical constitutional elements to those of the clock switching circuit 1 shown in FIG. 1 have been allocated identical reference symbols, and detailed description thereof has been omitted.

As shown in FIG. 6, the clock switching circuit 31 according to this embodiment comprises a clock control circuit 33 serving as a first switching control unit in place of the clock control circuit 13 of the clock switching circuit 1 shown in FIG. 1. The PLL enable signal DLLE, in addition to the determination signal 12a of the Lock determination circuit 12, is input into the clock switching circuit 33. Further, the clock control circuit 33 generates switching signals SWB1, SWB2 in addition to the switching signal SWTB.

The clock switching circuit 31 comprises a multiplexer 46 serving as a first external/internal clock selection unit for selecting the external clock CLKB or the internal clock PLTB in accordance with the switching signal SWB1 and outputting the selected clock as the clock CKTB. The clock switching circuit 31 also comprises a multiplexer 47 serving as a first feedback path selection unit for selecting the output RPB of the delay circuit 11 or the output (PLL clock PLB) of the B side PLL circuit 3 and returning the selected output to the B side PLL circuit 3 as a feedback signal FRB. The clock switching circuit 31 also comprises a transfer gate 48 having an identical delay to the multiplexer 46. In relation to the T side, the clock switching circuit 31 comprises a Lock determination circuit 42 for outputting a Lock determination signal 42a, a clock control circuit 43 serving as a second switching control unit, a multiplexer 44 serving as a second external/internal clock selection unit, and a multiplexer 45 serving as a second feedback path selection unit, which correspond respectively to their counterparts on the B side.

When the PLL enable signal DLLE is input into the clock control circuit 33 during an operation using the internal clocks PLTT, PLTB, the clock control circuit 33 generates the switching signal SWTB of the multiplexer 14 in synchronization with the offset clock PLQB, and switches the output of the multiplexer 14 from PLB to an inverted signal of PLT. Further, at a timing delayed by one clock from the switching signal SWTB, for example, the clock control circuit 33 generates the switching signal SWB2 of the multiplexer 47, switches the output of the multiplexer 47 from the output RPB of the delay circuit 11 to the output PLB of the PLL circuit 3, and switches the feedback path. As a result, the B side PLL circuit 3 enters an unlocked state. When the B side PLL circuit 3 enters a locked state after a predetermined amount of time, the outputs PLT, PLB of the PLL circuits 2, 3 and the external clocks CLKT, CLKB are phase-aligned. Thus, the Lock determination signal 12a is output by the Lock determination circuit 12, and the clock control circuit 33 generates the switching signal SWB1 of the multiplexer 46, which is obtained by synchronizing the Lock determination signal 12a with the offset clock PLQB, and switches the output of the multiplexer 46 from the internal clock PLTB to the external clock CLKB. Similarly on the T side, when the multiplexer 14 has been switched to the inverted signal of PLT, the feedback loop is switched, and when the PLL circuit 2 has been locked, the internal clock PLTT is switched to the external clock CLKT.

On the other hand, when the PLL enable signal is input during an operation using the external clocks CLKT, CLKB, the clock control circuits 33, 43 switch the feedback loop to the output side of the replica delay circuit, switch the external clocks CLKT, CLKB to the internal clocks PLTT, PLTB, and once the PLL circuit 3 has been locked, switch the output of the multiplexer 14 from the inverted signal of PLT to PLB. When the inverted signal of PLT and PLB are switched to obtain the internal clock PLTB while switching from the internal clocks PLTT, PLTB to the external clocks CLKT, CLKB, the multiplexers 14, 44, 45 are all switch-controlled using switching signals synchronized with the offset clocks PLQT, PLQB, and therefore glitches do not occur.

Figure 7:
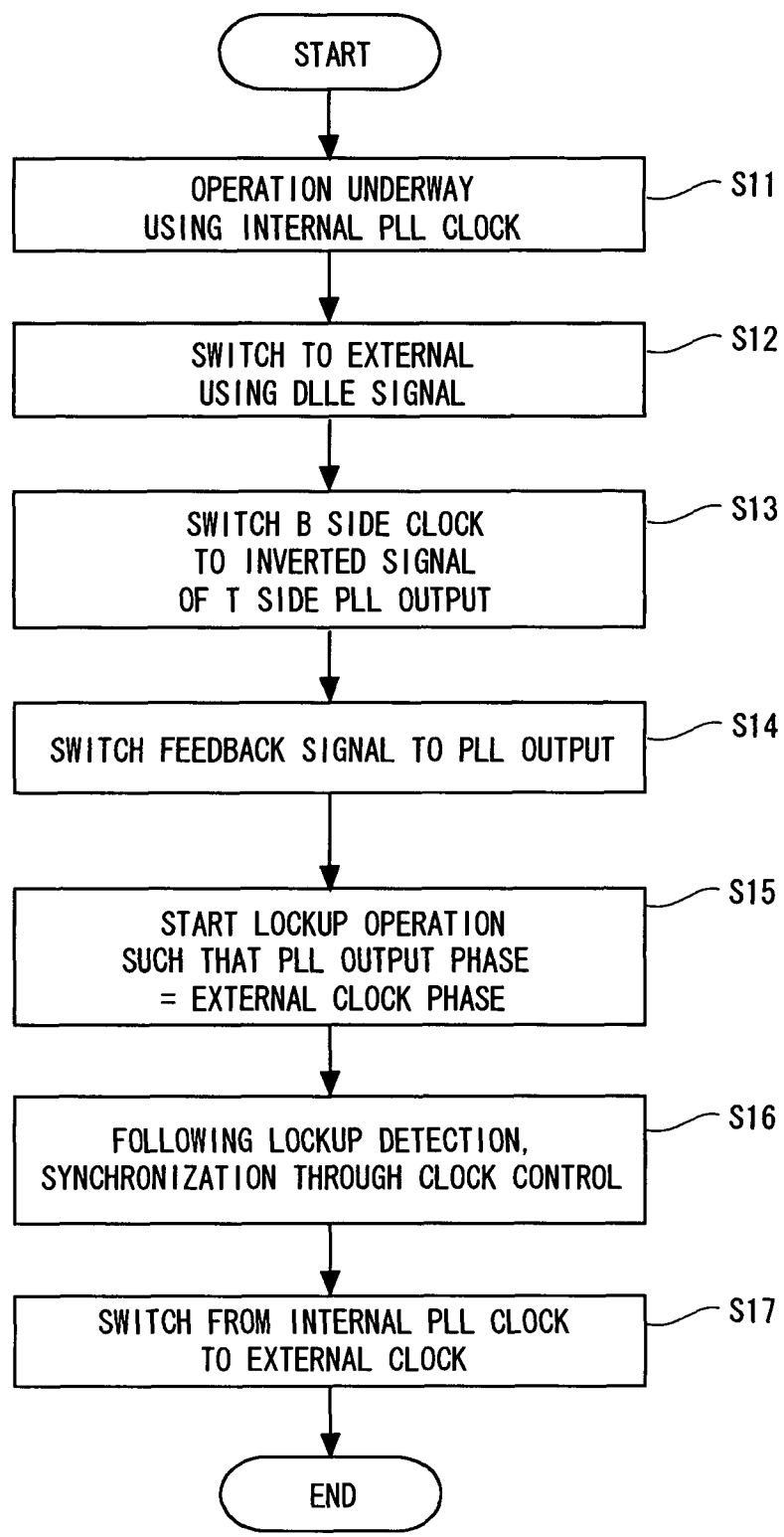
FIG. 7 is a view showing an operation of the clock switching circuit according to the second embodiment of the present invention in the form of a flowchart showing an operation for switching from an internal clock to an external clock.
Figure 8:
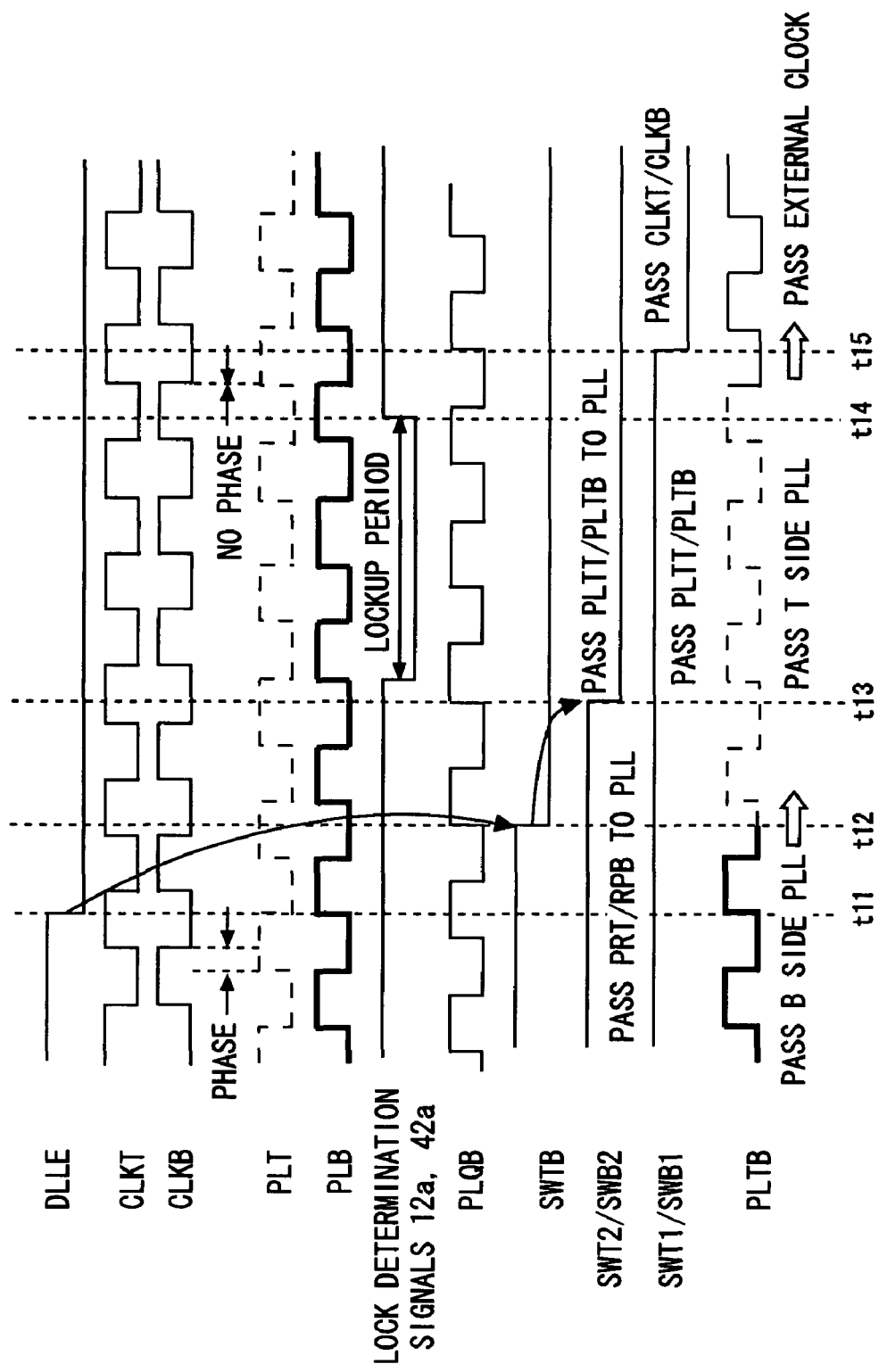
FIG. 8 is a view showing an operation of the clock switching circuit according to the second embodiment of the present invention in the form of a timing chart during switching from the internal clock to the external clock.

Next, an operation of the clock switching circuit according to this embodiment will be described. First, an operation for switching the internal clock to the external clock on the basis of the clock enable signal DLLE will be described. FIG. 7 is a flowchart showing an operation performed when switching from the internal clock to the external clock on the basis of the PLL output, and FIG. 8 is a timing chart corresponding thereto. Note that switching control of the multiplexers 44, 45 is similar to that of the multiplexers 46, 47, and therefore only switching control of the multiplexers 46, 47 will be described here. During an operation using the internal PLL clock (step S11), the PLL enable signal DLLE is switched OFF by a user from outside (step S12, timing t11 in FIG. 8). As a result, first the output PLTB of the multiplexer 14 is switched from the output PLB of the B side PLL circuit 3 to the inverted signal of the T side PLL circuit 2 (step S13, timing t12 in FIG. 8). When the PLL enable signal DLLE is input into the clock control circuit 33, the clock control circuit 33 generates the switching signal SWTB for switching the multiplexer 14 in synchronization with the offset clock PLQB, and switches PLTB to the inverted signal of the T side PLL circuit 2.

Next, feedback loop switching is performed to switch the feedback signal FRB leading to the B side PLL circuit 3 from the output RPB of the delay circuit 11 to the B side PLL output PLB (step S14, timing t13 in FIG. 8). After the multiplexer 14 has been switched, the clock control circuit 33 generates the switching signal SWB2 for switching the multiplexer 47 in synchronization with the offset clock PLQB, and switches the feedback signal FRB to the B side PLL output PLB. When the feedback signal FRB is switched, the B side PLL circuit 3 enters an unlocked state such that the Lock determination signal 12a becomes Low. When the Lock determination circuit 12 detects a lockup following the elapse of the lockup period (at a timing t14 in FIG. 8), the Lock determination signal 12a becomes High. Upon reception of the Lock determination signal 12a, the clock control circuit 33 generates the switching signal SWBL in synchronization with the offset clock PLQB (step S16). In accordance with the switching signal SWB1, the selection of the multiplexer 46 switches from the internal PLL clock to the external clock CLKB (step S17, timing t15 in FIG. 8).

Figure 9:
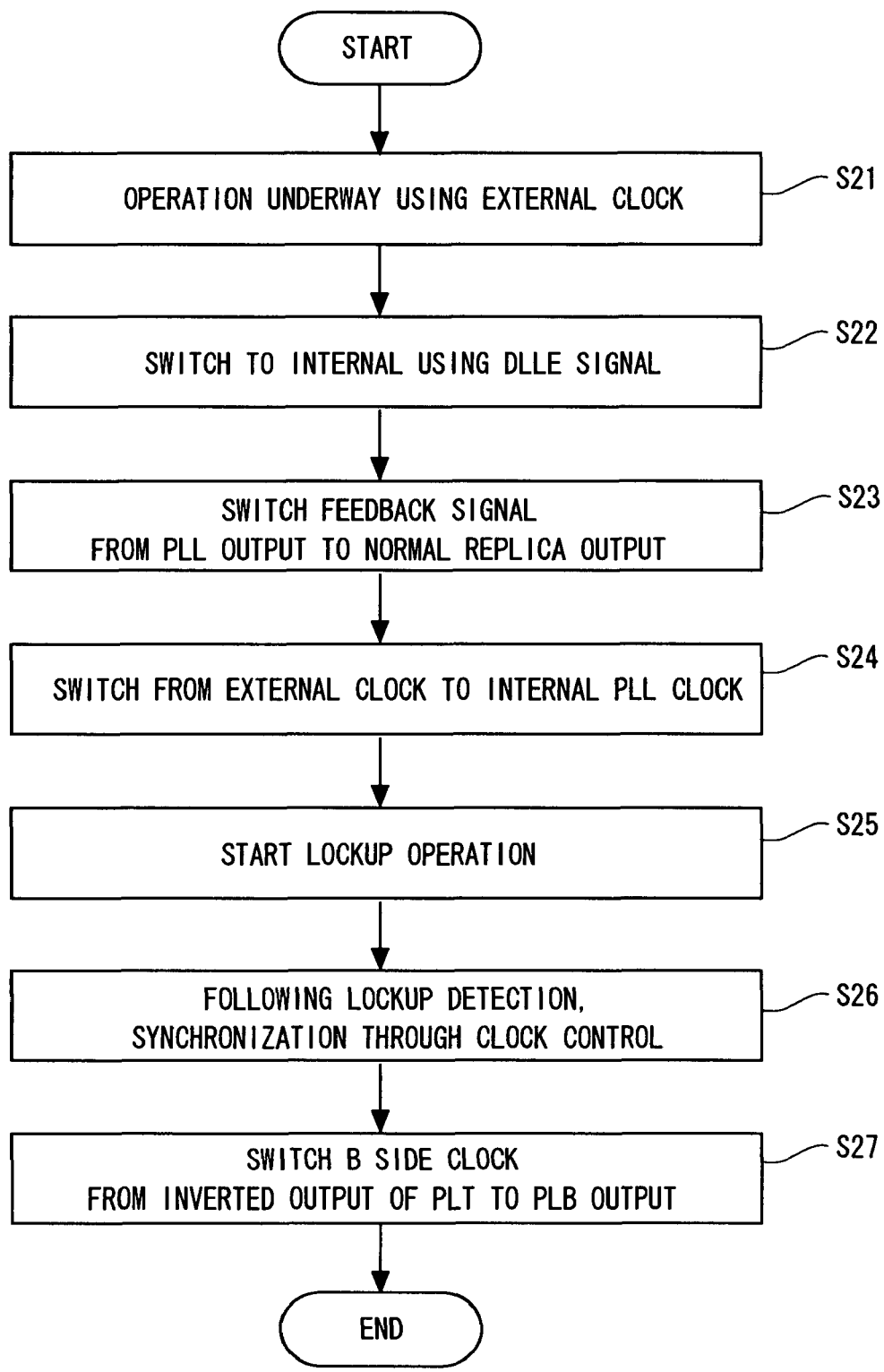
FIG. 9 is a view showing an operation of the clock switching circuit according to the second embodiment of the present invention in the form of a flowchart showing an operation for switching from the external clock to the internal clock.
Figure 10:
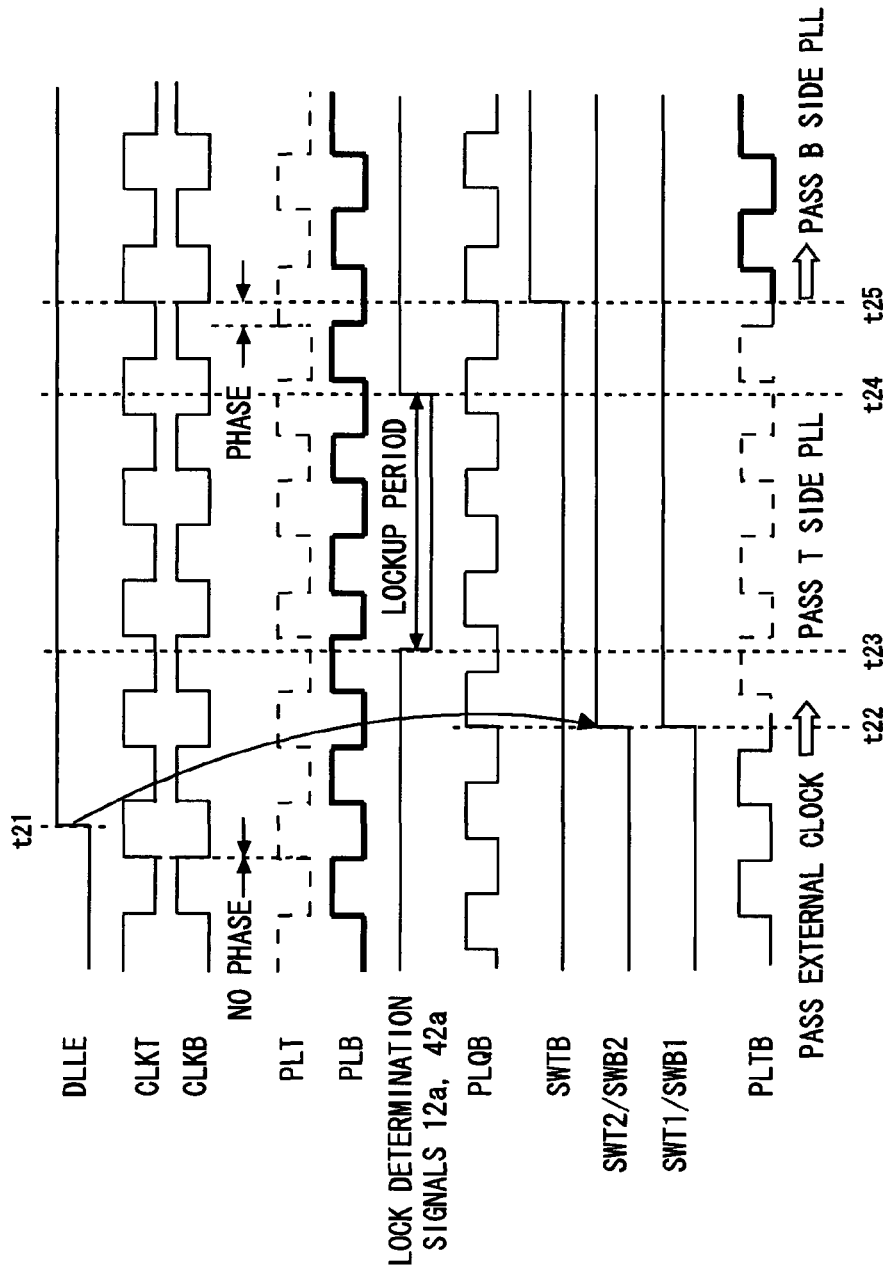
FIG. 10 is a view showing an operation of the clock switching circuit according to the second embodiment of the present invention in the form of a timing chart during switching from the external clock to the internal clock.

Next, an operation for switching from the external clock to the internal clock on the basis of the PLL enable signal will be described. FIG. 9 is a flowchart showing an operation for switching the external clock to the internal PLL clock, and FIG. 10 is a timing chart corresponding thereto. Here, an operation for switching from the external clock CLKB to the internal clock PLTB will be described. This involves a series of operations for switching from the external clock CLKB to the internal clock PLTB and switching the internal clock PLTB from the inverted signal of the T side PLL 2 to the output (PLL clock PLB) of the B side PLL 3.

When the PLL enable signal becomes High such that PLL is enabled (step S22, timing t21 in FIG. 10) during an operation using the external clock (step S21), first the feedback signal FRB leading to the B side PLL circuit 3 is switched from the output of the B side PLL circuit 3 to the output RPB of the delay circuit 11 (step S23). Simultaneously, the selection of the multiplexer 46 is switched from the external clock CLKB to the internal clock PLTB, and this selection is output as the clock CKTB (step S24). Hence, when the PLL enable signal, DLLE becomes High, the clock control circuit 33 generates the switching signals SWB2, SWB1 for switching the multiplexers 47, 46 in synchronization with the offset clock PLQB (timing t22 in FIG. 10). Note that the switching timings need not be simultaneous as long as they are synchronous with the offset clock PLQB. Up to the timing t22, the output of the B side PLL circuit 3 is used as the feedback signal FRB, and therefore the external clock CLKB and the output PLB of the B side PLL are in phase. Further, at the timing t22 for switching to the internal clock, the inverted signal of the T side PLL circuit 2 is selected as the internal clock PLTB by the multiplexer 14.

As a result of switching the feedback signal FRB, the B side PLL circuit 3 enters an unlocked state, and the Lock determination signal 12*a* becomes Low (timing t23 in FIG. 10). The B side PLL circuit 3 then begins a lockup operation (step S25). When the B side PLL circuit 3 enters a locked state, the Lock determination circuit 12 detects this and sets the Lock determination signal 12*a* to High again (timing t24 in FIG. 10). Upon reception of the Lock determination signal 12*a*, the clock control circuit 33 synchronizes the Lock determination signal 12*a* with the offset clock PLQB, and generates the switching signal SWTB (step S26). The selection of the multiplexer 14 outputting the internal clock PLTB is then switched from the inverted signal of the T side PLL circuit 2 to the output of the B side PLL circuit 3 (step S27, timing t25 in FIG. 10). As a result, the external clock CLKB is switched to the internal clock PLTB that has passed through the B side PLL circuit 3. Note that switching from the external clock CLKT to the internal clock PLTT is performed similarly.

In this embodiment, when switching between the external clocks CLKT, CLKB and the internal clocks. PLTT, PLTB, the feedback signals FRT, FRB (feedback loops) returning to the PLL circuits 2, 3 are switched, the external clocks CLKT, CLKB and the output clocks PLT, PLB of the PLL circuits 2, 3 are phase-aligned, and then switching to the clock tree is performed. By matching the phases of the external clocks CLKT, CLKB and internal clocks PLTT, PLTB, similar switching to that of the first embodiment can be performed. In other words, by performing switching in synchronization with the clocks PLQT, PLQB, which are offset from the PLL outputs by a constant phase, glitches do not occur in the clock tree. A similar effect is obtained when switching from the internal clocks PLTT, PLTB to the external clocks CLKT, CLKB.

Third Embodiment

Figure 11:
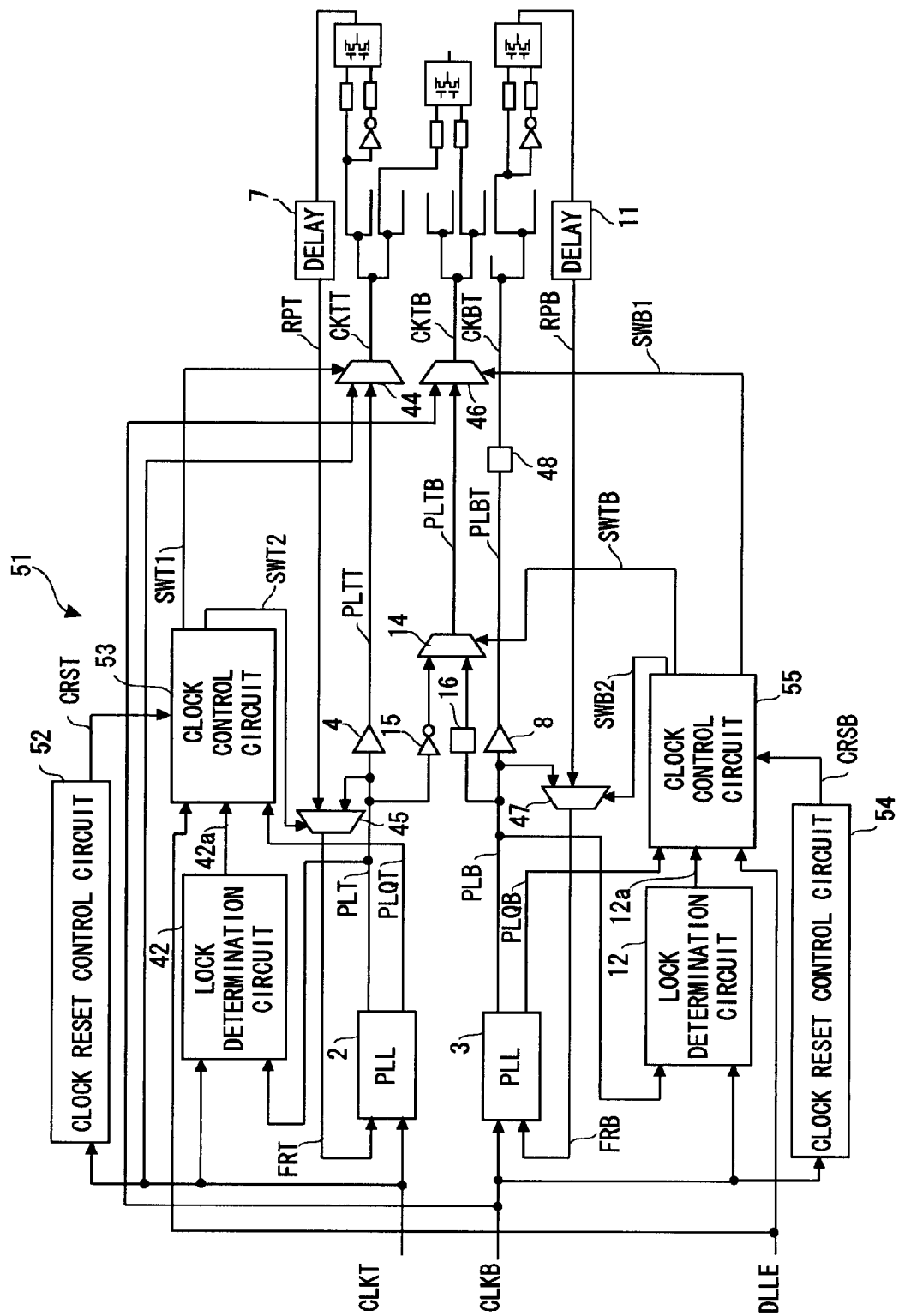
FIG. 11 is a block diagram showing a clock switching circuit according to a third embodiment of the present invention.

Next, a third embodiment of the present invention will be described. This embodiment relates to a clock switching circuit in which glitches are not generated by a similar switching circuit even when an external clock is stopped. FIG. 11 is a block diagram showing a clock switching circuit according to this embodiment. In a clock switching circuit 51 according to this embodiment, clock reset determination circuits 52, 54 serving as first and second stoppage control units are provided in relation to each external clock of the clock switching circuit shown in FIG. 6. Further, clock control circuits 53, 55 according to this embodiment differ from the clock control circuits 43, 33 according to the second embodiment in being supplied with clock reset signals CRST, CRSB from the respective clock reset determination circuits 52, 54.

The clock reset determination circuits 52, 54 are supplied with the external clocks CLKT, CLKB, and when the frequency of the external clocks CLKT, CLKB is lower than a fixed frequency serving as a reference, it is determined that a clock stoppage has occurred, and the clock reset signals CRST, CRSB are activated. In other words, a High clock reset signal CRST is supplied to the clock control circuits 53, 55 at the point in time when the clock stoppage is determined, for example. Having been supplied with the clock reset signals CRST, CRSB, the clock control circuits 53, 55 perform similar switching control to that of the second embodiment. Thus, a clock stoppage can be realized without generating an internal glitch even when the external clock is stopped.

More specifically, when the clock control circuits 53, 55 are supplied with the clock reset signals CRST, CRSB, first the clock control circuit 55 switches the output of the multiplexer 14 from PLB to the inverted signal of PLT. Next, the clock control circuits 53, 55 switch the respective outputs of the multiplexers 45, 47 to the PLL outputs in order to switch the feedback paths. Then, once a lockup has been detected and the outputs PLT, PLB of the PLL circuits 2, 3 have been phase-aligned with the external clocks CLKT, CLKB, the clock control circuits 53, 55 switch the output of the multiplexers 44, 46 from the internal clocks PLTT, PLTB to the external clocks CLKT, CLKB.

In this embodiment also, when switching two clocks having different phases, the characteristics of the PLL are used to lock the clocks in phase in advance, and in this state, synchronous switching is performed by another clock output from the PLL itself and having a phase that is offset by a fixed value. By means of this series of switching processes, hazards, glitches, and so on can be prevented from occurring during switching.

Note that the present invention is not limited to the embodiments described above, and may be modified in various ways within a scope that does not depart from the spirit of the present invention. For example, in the embodiments described above, a phase adjustment circuit is described as a PLL, but may also be constituted by a DLL (Delay Locked Loop). Further, in the first embodiment the Lock determination circuit 12 and clock control circuit 13 are provided on the B side, but may of course be provided on the T side or on both sides.

It is apparent that the present invention is not limited to the above embodiment, but may be modified and changed without departing from the scope and spirit of the invention.

What is claimed is:

1. A clock switching circuit for switching and outputting a plurality of clocks having different phases, comprising:
    a first phase adjustment circuit for outputting a first phase adjusted clock following input of a first external clock;
    a selection unit for selecting and outputting the first phase adjusted clock or another clock having a different phase to the first phase adjusted clock; and
    a switching control unit for subjecting the selection unit to switching control on the basis of the first phase adjusted clock and an asynchronous switching instruction signal that is asynchronous with the other clock, which switches an output of the selection unit in synchronization with an offset clock that is offset from the phase of the first phase adjusted clock by a predetermined value, when the asynchronous switching instruction signal is input therein.

2. The clock switching circuit according to claim 1, further comprising a second phase adjustment circuit for outputting a second phase adjusted clock following input of a second external clock having a different phase to the first external clock,
    wherein the selection unit selects and outputs the first phase adjusted clock or an inverted signal of the second phase adjusted clock.

3. The clock switching circuit according to claim 2, wherein the first and second phase adjustment circuits are respectively a first PLL circuit for outputting a first PLL clock and a second PLL circuit for outputting a second PLL clock,
    a lock state detection circuit is provided for detecting a lock state of the first PLL circuit, the lock state detection circuit outputs a detection signal serving as the asynchronous switching instruction signal after detecting that the first PLL circuit has entered a locked state, and the switching control unit switches the output of the selection unit from an inverted signal of the second PLL clock to the first PLL clock in synchronization with the offset clock when the detection signal is input therein.

4. The clock switching circuit according to claim 2, wherein the phase of the first external clock differs from the phase of the second external clock by 180°.

5. The clock switching circuit according to claim 3, wherein the phase of the first external clock differs from the phase of the second external clock by 180°.

6. The clock switching circuit according to claim 3, wherein the first and second PLL circuits each comprise a feedback path for outputting the first and second PLL clocks having predetermined phase differences to the first and second external clocks, respectively.

7. The clock switching circuit according to claim 3, wherein the first and second PLL circuits each comprise a feedback path for outputting the first and second PLL clocks having predetermined phase differences to the first and second external clocks, respectively.

8. A clock switching circuit comprising:
a first external/internal clock selection unit for selecting and outputting a first external clock or a first internal clock;
a PLL circuit for outputting a first PLL clock following input of a second external clock having a different phase to the first external clock;
a second external/internal clock selection unit for selecting and outputting the second external clock or a second PLL clock, which serves as a second internal clock having a different phase to the first internal clock; and
first and second switching control units for respectively subjecting the first and second external/internal clock selection units to switching control on the basis of an asynchronous switching instruction signal supplied from outside asynchronously with the first and second external clocks,
wherein the first and second switching control units switch the outputs of the first and second external/internal clock selection units in synchronization with first and second offset clocks that are offset from the respective phases of the first and second PLL clocks by predetermined values, when the asynchronous switching instruction signal is input therein.

9. The clock switching circuit according to claim 8, wherein the first internal clock is an inverted signal of the PLL clock.

10. The clock switching circuit according to claim 8, further comprising:
a first PLL circuit for outputting the first PLL clock following input of the first external clock; and
a selection unit for selecting and outputting the first internal clock,
wherein the PLL circuit is a second PLL circuit for outputting the second PLL clock, and
the selection unit selects and outputs the first PLL clock or an inverted signal of the second PLL clock as the first internal clock.

11. The clock switching circuit according to claim 10, further comprising a first lock state detection circuit for detecting a lock state of the first PLL circuit, wherein the first lock state detection circuit outputs a detection signal that is asynchronous with the first PLL clock after detecting that the first PLL clock has entered a locked state, and the first switching control unit switches the output of the selection unit from the inverted signal of the second PLL clock to the first PLL clock in synchronization with the first offset clock when the detection signal is input therein.

12. The clock switching circuit according to claim 10, wherein the first and second PLL circuits each comprise a first feedback path for performing feedback such that a PLL clock having a predetermined phase difference to the external clock is output, a second feedback path for performing feedback such that the phase of the PLL clock is aligned with the phase of the external clock, and a feedback path selection unit for switching the first and second feedback paths, and when the asynchronous switching instruction signal is input, the first and second switching control units subject the feedback path selection unit of the first PLL circuit and the feedback path selection unit of the second PLL circuit, respectively, to switching control in synchronization with the respective first and second offset clocks.

13. The clock switching circuit according to claim 11, wherein the first and second PLL circuits each comprise a first feedback path for performing feedback such that a PLL clock having a predetermined phase difference to the external clock is output, a second feedback path for performing feedback such that the phase of the PLL clock is aligned with the phase of the external clock, and a feedback path selection unit for switching the first and second feedback paths, and when the asynchronous switching instruction signal is input, the first and second switching control units subject the feedback path selection unit of the first PLL circuit and the feedback path selection unit of the second PLL circuit, respectively, to switching control in synchronization with the respective first and second offset clocks.

14. The clock switching circuit according to claim 10, wherein the phase of the first external clock differs from the phase of the second external clock by 180°.

15. The clock switching circuit according to claim 11, wherein the phase of the first external clock differs from the phase of the second external clock by 180°.

16. The clock switching circuit according to claim 12, wherein the phase of the first external clock differs from the phase of the second external clock by 180°.

17. The clock switching circuit according to claim 8, further comprising a second lock state detection circuit for detecting the lock state of the second PLL circuit, wherein, when the asynchronous switching instruction signal is input during output of the first and second internal clocks, the first switching control unit switches a selection of the selection unit from the first PLL clock to the inverted signal of the second PLL clock, the first and second switching control units cause the first and second feedback path selection units to select the second feedback path, respectively, and when the first and second lock detection circuits detect the respective lock states and output a detection signal, the first and second switching control units cause the first and second external/internal clock selection units to select and output the first and second external clocks, respectively.

18. The clock switching circuit according to claim 10, wherein, when the asynchronous switching instruction signal is input during output of the first and second external clocks, the first and second switching control units cause the first and second feedback path selection units to select the first feedback path, respectively, and cause the first and second external/internal clock selection units to select and output the first and second external clocks, respectively, and when the first lock detection circuit detects the lock state and outputs the detection signal, the first switching control unit switches the selection of the selection unit from the inverted signal of the second PLL clock to the first PLL clock.

19. The clock switching circuit according to claim 11, wherein, when the asynchronous switching instruction signal is input during output of the first and second external clocks, the first and second switching control units cause the first and second feedback path selection units to select the first feedback path, respectively, and cause the first and second external/internal clock selection units to select and output the first and second external clocks, respectively, and when the first lock detection circuit detects the lock state and outputs the detection signal, the first switching control unit switches the selection of the selection unit from the inverted signal of the second PLL clock to the first PLL clock.

20. The clock switching circuit according to claim 10, further comprising first and second stoppage control units for detecting respective frequencies of the first and second external clocks, wherein, when the frequencies of the first and second external clocks are respectively lower than a predetermined value, the first and second stoppage control units detect the frequencies and respectively output first and second stoppage control signals, and on the basis of the first and second stoppage control signals, the first and second switching control units perform control to stop the first and second PLL circuits, respectively, in synchronization with the first and second offsets clocks.

* * * * *